United States Patent
Drewes et al.

(10) Patent No.: US 8,104,353 B2
(45) Date of Patent: Jan. 31, 2012

(54) CAPACITIVE PRESSURE SENSOR

(75) Inventors: Ulfert Drewes, Müllheim (DE); Frank Hegner, Lörrach (DE); Andreas Rossberg, Bad Säckingen (DE); Elke Schmidt, Bad Säckingen (DE); Sabine Stolle, Dresden (DE); Christel Kretschmar, Dohria (DE); Melanie Hentsche, Dresden (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 117 days.

(21) Appl. No.: 12/451,209

(22) PCT Filed: Jun. 4, 2008

(86) PCT No.: PCT/EP2008/056880
§ 371 (c)(1),
(2), (4) Date: Mar. 19, 2010

(87) PCT Pub. No.: WO2008/148779
PCT Pub. Date: Dec. 11, 2008

(65) Prior Publication Data
US 2010/0199778 A1  Aug. 12, 2010

(30) Foreign Application Priority Data
Jun. 4, 2007 (DE) .......... 10 2007 026 243

(51) Int. Cl.
*G01L 9/12* (2006.01)
*H01R 43/00* (2006.01)
(52) U.S. Cl. ............ 73/718; 73/724; 361/283.1; 29/825
(58) Field of Classification Search .......... None
See application file for complete search history.

(56) References Cited

U.S. PATENT DOCUMENTS

| | | | |
|---|---|---|---|
| 3,808,480 A * | 4/1974 | Johnston | 361/283.4 |
| 3,929,609 A | 12/1975 | Gray | |
| 3,944,696 A | 3/1976 | Larry | |
| 4,225,632 A | 9/1980 | Ho | |
| 4,287,553 A | 9/1981 | Braunlich | |
| 4,567,151 A | 1/1986 | Taylor | |
| 5,571,970 A * | 11/1996 | Mutoh et al. | 73/724 |
| 5,877,934 A | 3/1999 | Sano | |
| 6,148,674 A * | 11/2000 | Park et al. | 73/724 |
| 6,374,680 B1 | 4/2002 | Drewes | |
| 2002/0046861 A1 | 4/2002 | Yokoyama | |
| 2004/0237658 A1* | 12/2004 | Ohms et al. | 73/718 |
| 2004/0250627 A1* | 12/2004 | Jacob | 73/723 |

FOREIGN PATENT DOCUMENTS
CN  1460093 A  12/2003
(Continued)

*Primary Examiner* — Andre Allen
(74) *Attorney, Agent, or Firm* — Bacon & Thomas, PLLC

(57) ABSTRACT

A pressure sensor includes a platform and an elastic measuring membrane, which is joined with a surface of the platform to form a measuring chamber sealed closed at the edge, wherein the platform and/or the measuring membrane comprise ceramic, glass or a single crystal material, the measuring membrane has at least a first electrode, which faces the surface of the platform, the surface of the platform has at least a second electrode, which faces that of the measuring membrane. The capacitance between the first electrode and the second electrode is a measure for the pressure to be measured; wherein additionally at least one of the first and second electrodes comprises a conductive layer, which contains metal and glass, and wherein the metal comprises at least two noble metal elements.

23 Claims, 3 Drawing Sheets

FOREIGN PATENT DOCUMENTS

| | | |
|---|---|---|
| DE | 29 33 006 | 2/1980 |
| EP | 0 156 757 A2 | 10/1985 |
| EP | 0 156 757 B1 | 10/1985 |
| EP | 0 962 752 A1 | 12/1999 |
| JP | 58011565 | 1/1983 |
| JP | 02109314 | 4/1990 |

* cited by examiner

CAPACITIVE PRESSURE SENSOR

The present invention relates to a capacitive pressure sensor.

BACKGROUND DISCUSSION

Capacitive pressure sensors comprise a platform resistant to bending and an elastic measuring membrane, or diaphragm, which is joined with a surface of the platform to form a measuring chamber sealed closed on the edge, wherein: the platform and/or the measuring membrane comprise(s) ceramic, glass or a single crystal material; the measuring membrane includes at least a first electrode, which faces the surface of the platform; and the surface of the platform includes at least a second electrode, which faces that of the measuring membrane, and capacitance between the first electrode and the second electrode is a measure for pressure to be measured.

Typical electrode materials are metals, which are deposited on the platform or the measuring membrane, especially vapor deposited or sputter deposited. For example, tantalum is a metal considered for this application, because it is compatible with a high vacuum soldering process, which is used to connect the platform and the measuring membrane, for example, by means of an active hard solder, or braze.

Pressure sensors of such kind are moisture sensitive in different degrees, since even on a macroscopically smooth ceramic surface, there are still many defects present for adsorption of water molecules. In order to lessen the moisture dependence, the surfaces in the measuring chamber can be made hydrophobic and/or they can be coated with a glass layer.

In this way, basically, pressure sensors with an acceptable moisture sensitivity can be manufactured. However, there is an additional contribution to moisture sensitivity, which is only conditionally manageable with the described measures. More exact investigations have shown, namely, that, in the edge regions of the electrodes, no sharp boundary between electrode and shiny substrate exists, but, instead, insulated islands, or clusters of electrode material can occur outside of the desired edge of the electrode surface. One of the causes for this cluster formation outside the desired edge of the electrode surface could relate to the masks, with which the platform, or the measuring membranes, are covered during the sputter deposition or vapor deposition of the electrode material. When the masks are not sufficiently sealed off, electrode material can reach regions of the surface covered by the masks and aggregate there to clusters.

The clusters, isolated per se, can nevertheless be wetted by low amounts of adsorbed water molecules. This contributes to the total capacitance of the electrodes, and, in turn, leads to a degrading of the accuracy of measurement.

Furthermore, electrodes of tantalum tend, at high temperatures, for example, above 180° C., to oxidize, which likewise changes the effective surface area of the electrodes and, therewith, degrades the accuracy of measurement.

It is, therefore, an object of the present invention to provide an improved pressure sensor compared to the state of the art.

The object achieved is according to the invention by a pressure sensor comprising a platform essentially resistant to bending; and at least one elastic measuring membrane, which is joined with a surface of the platform to form a measuring chamber sealed closed at the edge; wherein the platform and/or the measuring membrane comprise(s) ceramic, glass or a single crystal material; the measuring membrane includes at least a first electrode, which faces the surface of the platform; the surface of the platform includes at least a second electrode, which faces that of the measuring membrane, and capacitance between the first electrode and the second electrode is a measure for pressure to be measured; characterized in that at least one of the first and second electrodes comprises a conductive layer, which contains metal and glass, wherein the metal comprises at least one noble metal element.

In an embodiment of the invention, the conductive layer has a volume ratio of metal to glass of, for example, not more than 4:1, preferably not more than 3:1, further preferably not more than 2.5:1, and especially preferably not more than 2.3:1. Furthermore the conductive layer has, for example, a volume ratio of metal to glass of not less than 1.5:1, preferably not less than 1.8:1, further preferably not less than 2.1:1

In a currently preferred embodiment of the invention, the conductive layer has a volume ratio of noble metal to glass of about 2.2:1

The noble metal can be, especially, noble metal elements of group 10 or 11 of the periodic system of the elements, according to the so-called new notation (compare Chemical and Engineering News, 63(5), 27, 1985). Currently preferable are Au, Ag, Pd and Pt. In an embodiment of the invention, the conductive layer comprises at least one noble metal of group 11 or/and at least one noble metal of group 10.

The noble metals can be present alloyed and/or in elemental form in the conductive layer.

In a first embodiment of the invention, the stoichiometric ratio of metals of group 11 to metals of group 10, thus the ratio of the number of atoms of the metals of group 11 to the number of atoms of the metals of group 10 is, for example, not more than 20:1, preferably not more than 10:1 and further preferably not more than 5:1. The stoichiometric ratio of metals of group 11 to metals of group 10 amounts, according to the first embodiment, for example, to not less than 1.5:1, preferably not less than 2:1 and further preferably not less than 3:1. In a currently preferred embodiment of the invention, the stoichiometric ratio of metals of group 11 to metals of group 10 amounts to about 4:1.

In another embodiment of the invention, the stoichiometric ratio of metals of group 10 to metals of group 11 amounts, for example, to not less than 3.5:1, preferably not less than 4:1 and further preferably not less than 5:1.

In an embodiment of the invention, the conductive layer comprises glass, which apart from impurities present in given circumstances, contains no lead and/or no boron. B containing and/or Pb containing glasses have, due to thermal degradation, or due to the evaporation of some components at high temperatures under vacuum, proven to be unsuitable.

In an embodiment of the invention, the conductive layer comprises glass, which contains, for example, oxides of barium, silicon and/or aluminum.

For example, the glass contains not less than 45 mass-% and not more than 60 mass-% $SiO_2$, not less than 30 mass-% and not more than 40 mass-% BaO, as well as not less than 8 mass-% and not more than 16 mass-% $Al_2O_3$.

Preferably, the glass contains not less than 50 mass-% and not more than 56 mass-% $SiO_2$, not less than 33 mass-% and not more than 37 mass-% BaO, as well as not less than 10 mass-% and not more than 14 mass-% $Al_2O_3$.

In a currently preferred embodiment, the glass contains 53.1 mass-% $SiO_2$, 35.1 mass-% BaO and 11.8 mass-% $Al_2O_3$.

Preferably, glasses are used, which do not undergo excessive crystal formation during the firing, for marked crystalline domains can degrade the bonding and lead to increased moisture sensitivity.

The material of the conductive layer can be applied as paste by means of screen printing onto the surface of the platform, or onto the surface of the measuring membrane. The paste comprises the components of the conductive layer as well as an organic binder and solvent, which evaporates from the material in a drying step after the screen printing, or in a following firing step.

The paste can be, on a mass basis, for example, about ⅓th to ⅖ths organic binder and about ¾ths to ⅗ths metal and glass mixture. A currently preferred paste is, on a mass basis, about ⅓rd organic binder and about ⅔rds metal and glass mixture.

The paste can have, for example, noble metal particles with a BET surface area of not less than $0.08 \, m^2/g$, preferably not less than $0.12 \, m^2/g$ and further preferably not less than about $0.25 \, m^2/g$. In a currently preferred paste, Au particles have a BET surface area of about $0.3 \, m^2/l$. This corresponds to an average particle size of about 1 µm. Corresponding requirements on particle size hold for Pt.

Also finer granulations can be applied. In one paste, for example, Pt particles with a BET surface area of $m^2/g$ were used.

The particle size of the glass components, i.e. the glass, in the paste, can be, for example, up to 5 µm. Preferably, the average particle size lies between about 0.5 µm and 5 µm.

Used as organic binder can be, for example, ethyl cellulose in terpineol, or dibutyl phthalate.

For applying the paste by means of a screen printing method, for example, a stainless steel screen with 400 mesh, or a mesh size of about 37 µm, can be applied. An application of at least two layers is currently preferred. The lift-off can be, for example, 0.15 mm to 0.5 mm.

The paste applied with screen printing can have, for example, a coating thickness of not more than 100 µm, preferably not more than 50 µm and especially preferably not more than 25 µm.

Following the applying of the paste, a drying occurs, for example, at a somewhat elevated temperature between about 100° C. and 200° C. Currently, a drying temperature between 140° C. and 160° C. is preferred. The duration of the drying depends, among other things, on the coating thickness of the paste and the selected temperature. On the basis of experience, however, some minutes up to a quarter of an hour drying time should suffice.

Following drying, the layer is fired. For this, the temperature can be increased up to a maximum temperature, at which the layer is held for a predeterminable time, before cooling begins. The maximum temperature during the firing amounts to at least 900° C., preferably at least about 930° C. to 960° C. and especially preferably about 950° C. The length of firing can lie, for example, between one and two hours, wherein it is sufficient, when the maximum temperature is maintained for about 10 to 20 minutes.

The resulting coating thickness of the fired layer amounts to preferably not more than 8 µm, further preferably not more than 6 µm and especially preferably not more than 4 µm.

The conductive layers prepared on ceramic bodies in such a way distinguish themselves, preferably, by the fact that they withstand a subsequent high vacuum soldering, or brazing, process at a pressure of about 10-6 mbar and temperatures of about 910° C. undamaged and without release of decomposition products. Such a high vacuum soldering process is applied, for example, for joining the ceramic components of a sensor with active braze. The requirement is, thus, important, since adsorbed decomposition products of the glass could change the wettability of free surface sections of the ceramic bodies to be joined in such a manner, that the active braze would run onto these surface sections during the high vacuum process. In such case, the high vacuum soldering process could no longer be used. Such decomposition products were observed especially in the case of Pb, or B, containing glasses.

The pressure sensors of the invention have, as a result, a conductive layer, which is thermally stable and safely adheres to the ceramic substrate.

BRIEF DESCRIPTION OF THE DRAWING

The invention will now be explained on the basis of an example of an embodiment illustrated in the drawing, the figures of which show as follows.

Figure 1:
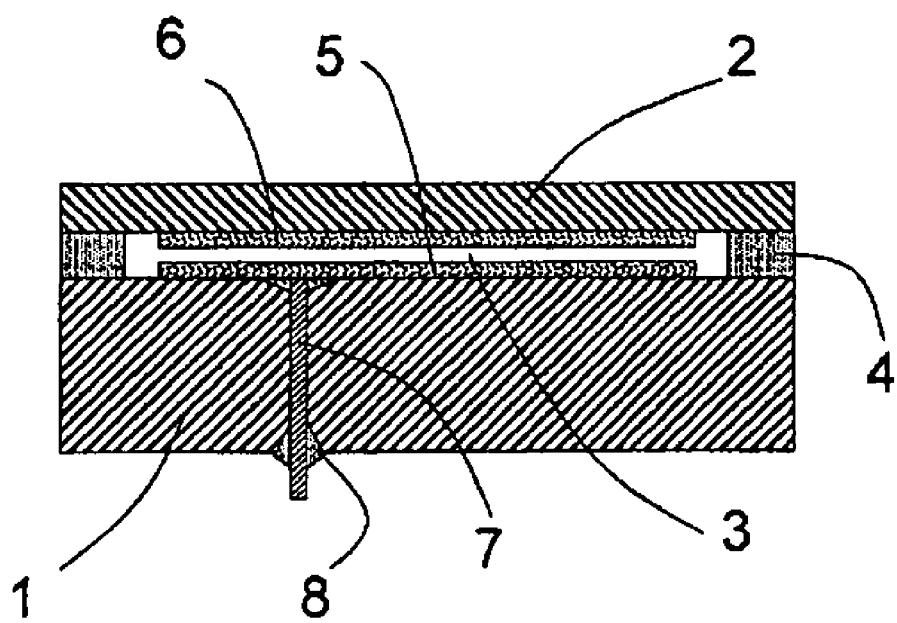
FIG. 1 is a longitudinal section through a capacitive, absolute pressure sensor of the invention.

The capacitive pressure sensor shown in FIG. 1 is an absolute pressure sensor. It comprises an essentially cylindrical, ceramic platform 1 and a circular, disk shaped, ceramic measuring membrane 2, which is connected to the platform 1 at an end of the platform 1 to form a pressure-tight measuring chamber 3. The measuring membrane 2 is, for this, joined with the platform 1 by means of an active solder ring 4 in a high vacuum soldering process at 910° C. Via the material thickness of the active solder ring, in such case, the distance between the measuring membrane 2 and the end of the platform 1 is predetermined. The distance can be, for example, 20 to 100 µm after the soldering process.

In the pressure chamber 3, on the end face of the platform 1, a first electrode 5 is arranged, and, on the surface of the measuring membrane 2 facing the measuring chamber, a second electrode 6. In measurement operation, the measuring membrane 2 is pressure-dependently deformed, whereby the capacitance between the first and second electrodes is altered. The electrodes comprise conductive layers of the electrode material of the invention.

The contacting of the electrodes can be accomplished with any feed-throughs known to those skilled in the art. For example, a metal pin 7 can be introduced into a suitable bore through the platform 1, wherein the metal pin 7 can be supplementally sealed and secured in place with an active braze sealing. Furthermore, one of the electrodes can be contacted from the lateral surface of the pressure sensor by means of the active hard solder.

The pressure sensor of the invention can, furthermore, be embodied as a relative pressure, or pressure difference, sensor.

A relative pressure sensor includes, in contrast to the absolute pressure sensor, a reference air path, which can comprise, for example, a bore through the platform.

A pressure difference sensor can be implemented as a two chamber, pressure difference sensor or as a one chamber, pressure difference sensor.

Figure 2:
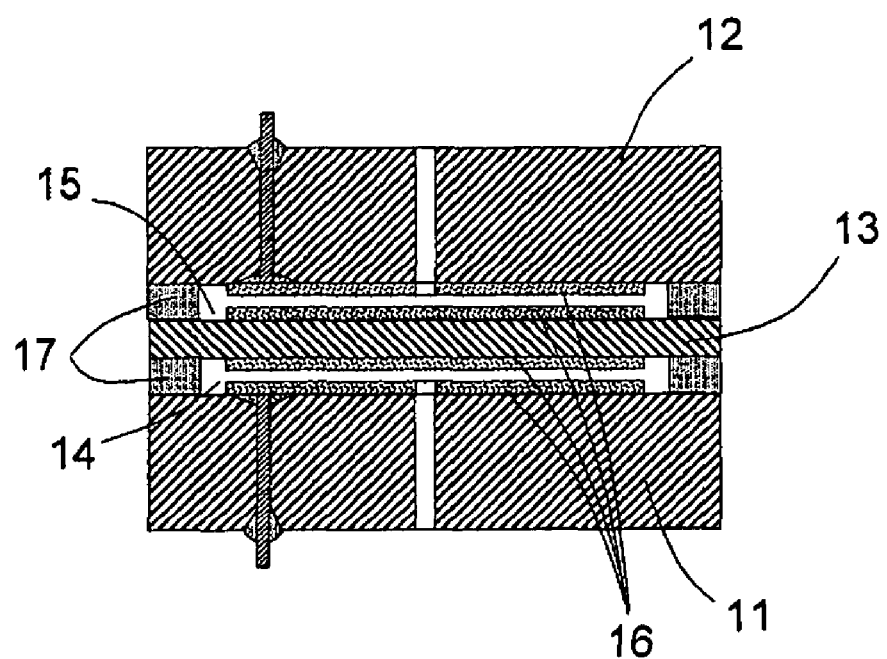
FIG. 2 is a longitudinal section through a capacitive, two chamber pressure difference sensor of the invention.

A two chamber, pressure difference sensor is shown in FIG. 2. It comprises a first cylindrical platform 11 and a second cylindrical platform 12 as well as a measuring membrane 13, which is joined by means of an active hard solder 17 with end faces of the first and second platforms to form a first measuring chamber 14 and a second measuring chamber 15. Each of the measuring chambers provides at least one measured capacitance, which in each case is formed between electrodes on the measuring membrane and on the end face of the respective platform and registered via suitable feed-throughs. The electrodes comprise conductive layers of the electrode material of the invention. The two measuring chambers are each supplied with media pressure via a bore through the associated platform.

Figure 3:
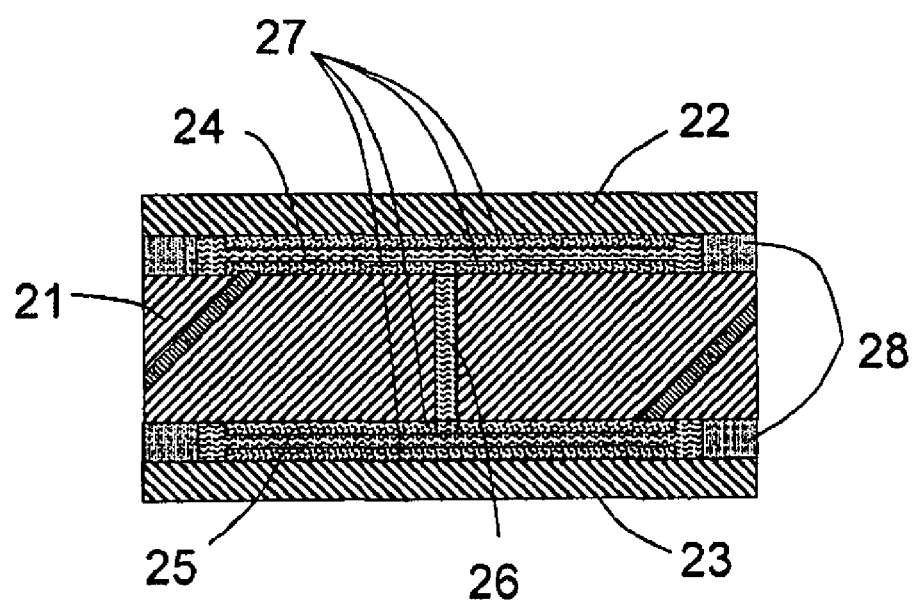
FIG. 3 is a longitudinal section through a capacitive, one chamber pressure difference sensor of the invention.

FIG. 3 shows, finally, a capacitive, one chamber, pressure difference sensor. On the two end faces of a cylindrical platform 21 are joined measuring membranes by means of active hard solder, or braze, 28, whereby between a first measuring membrane 22 and the platform a first measuring chamber portion 24 is formed, and between a second measuring membrane 23 and the platform a second measuring chamber portion 25 is formed. The two measuring chamber portions communicate via a canal 26 through the platform 21 and are filled with a transfer liquid, for example, a silicone oil. In each of the measuring chamber portions, an electrode pair is arranged, with, in each case, an electrode on the measuring membrane and an electrode on an end of the platform. The electrodes on the platform side are contacted, for example, via conductors extending from the lateral surface of the platform to the end faces of the platform.

The electrodes comprise a conductive layer of the electrode material of the invention, which contains glass and metal. The metal is at least one noble metal element, or two noble metal elements.

The electrode material of the pressure sensor of the invention has, in the currently preferred embodiment, a volume ratio of metal to glass of about 2.2 to 1. With rising metal fraction, the conductivity increases, while the adhesive strength of the layer decreases. A certain reduction of the adhering capability is tolerable. With decreasing metal fraction, the conductivity sinks accordingly.

The currently preferred glass has, on a mass basis, the following composition: 50% to 56% $SiO_2$, 33% to 37% BaO and 10% to 14% $Al_2O_3$.

The metal includes a mixture of Au and Pt in a mass ratio of about 4:1, wherein the gold particles have an average size of about 0.5 µm to about 1.2 µm and the Pt particles an average size of about 0.03 µm to about 0.05 µm.

In the manufacture of the electrodes, the solids (glass and metal) are mixed with an organic binder to form a paste composed, on a mass basis, of about ⅔rds solids and about ⅓rd binder.

The paste is applied onto corundum ceramic substrates by means of screen printing in one or two cycles, in order to form the conductive layers of the electrodes. The corundum ceramic substrates are the platform and the measuring membranes.

Following a drying at about 150° C. for about 15 minutes, the layers are fired, wherein the maximum temperature of the firing procedure amounts to about 950° C.

For manufacture of a pressure sensor of the invention, the platform and membranes, bearing the electrodes of the invention, are joined in a high vacuum, soldering process by means of active braze.

The invention claimed is:

1. A pressure sensor, comprising:
at least one platform; and
at least one elastic measuring membrane, which is joined with a surface of said at least one platform to form a measuring chamber sealed closed at the edge, wherein:
said platform and/or the measuring membrane comprise(s) ceramic, glass or a single crystal material;
said measuring membrane includes at least a first electrode, which faces the surface of said at least one platform, the surface of said at least one platform includes at least a second electrode, which faces said measuring membrane; capacitance between said at least said first electrode and said at least said second electrode is a measure for pressure to be measured; and
characterized in that at least one of said at least said first and second electrodes comprises a conductive layer, which contains metal and glass, and the metal comprises at least one noble metal element, and the glass is stable under high vacuum at 900° C.

2. The pressure sensor as claimed in claim 1, wherein:
the metal is present as an alloy of two noble metal elements.

3. The pressure sensor as claimed in claim 1, wherein:
the metal comprises coexisting domains of noble metal elements.

4. Pressure sensor as claimed in claim 1, wherein:
said conductive layer has a volume ratio of metal to glass of not more than 4:1, preferably not more than 3:1, further preferably not more than 2.5:1, and especially preferably not more than 2.3:1.

5. The pressure sensor as claimed in claim 1, wherein:
said conductive layer has a volume ratio of metal to glass of not less than 1.5:1, preferably not less than 1.8:1, further preferably not less than 2.1:1.

6. The pressure sensor as claimed in claim 1, wherein:
the noble metal elements are from group 10 or 11 of the periodic system of the elements according to the so-called new notation, especially the noble metal elements Au, Ag, Pd and/or Pt.

7. The pressure sensor as claimed in claim 1, wherein:
the noble metal elements comprise at least one noble metal of group 11 and at least one noble metal of group 10, especially Au in combination with Pt or Ag in combination with Pd.

8. The pressure sensor as claimed in claim 1, wherein:
the stoichiometric ratio of metals of group 11 to metals of group 10 amounts to not more than 20:1, preferably not more than 10:1 and further preferably not more than 5:1.

9. The pressure sensor as claimed in claim 1, wherein:
the stoichiometric ratio of metals of group 11 to metals of group 10 according to a first embodiment amounts to not less than 1.5:1, preferably not less than 2:1 and further preferably not less than 3:1.

10. The pressure sensor as claimed in claim 1, wherein:
the stoichiometric ratio of metals of group 10 to metals of group 11 amounts to not less than 3.5:1, preferably not less than 4:1 and further preferably not less than 5:1.

11. The pressure sensor as claimed in claim 1, wherein:
the conductive layer comprises a glass, which, apart from, in given circumstances, present impurities, contains no lead and/or no boron.

12. The pressure sensor as claimed in claim 1, wherein:
said conductive layer comprises a glass, which contains oxides of barium, silicon and/or aluminum, especially not less than 45 mass-% and not more than 60 mass-% $SiO_2$, not less than 30 mass-% and not more than 40 mass-% BaO, as well as not less than 8 mass-% and not more than 16 mass-% $Al_2O_3$.

13. The pressure sensor as claimed in claim 1, wherein:
said conductive layer comprises a glass, which contains not less than 50 mass-% and not more than 56 mass-% $SiO_2$, not less than 33 mass-% and not more than 37 mass-% BaO, as well as not less than 10 mass-% and not more than 14 mass-% $Al_2O_3$.

14. The pressure sensor as claimed in claim 1, wherein:
said conductive layer has a thickness of not more than 8 µm, preferably not more than 6 µm and especially preferably not more than 4 µm.

15. The pressure sensor as claimed in claim 1, wherein:
the pressure sensor is an absolute pressure sensor, a relative pressure sensor or a pressure difference sensor.

16. A method for manufacture a pressure sensor comprising at least one platform and at least one elastic measuring membrane, the method comprising the step of:
applying the conductive layer as paste by means of screen printing on the surface of the platform, or the surface of the measuring membrane.

17. The method as claimed in claim 16, wherein:
the paste is, on a mass basis, for example, ¼th to ⅖ths organic binder and about ¾ths to ⅗ths metal and glass mixture.

18. The method as claimed in claim 16, wherein:
the paste contains noble metal particles having a BET surface area of not less than 0.08 m^2/g, preferably not less than 0.12 m^2/g and further preferably not less than about 0.25 m^2/g.

19. The method as claimed in claim 16, wherein:
the organic binder comprises ethyl cellulose in terpineol or dibutyl phthalate.

20. The method as claimed in claim 16, wherein:
the particle size of glass components in the paste amounts to not more than 5 µm.

21. The method as claimed in claim 16, wherein:
after applying the paste, a drying occurs at a temperature between about 100° C. and 200° C.

22. The method as claimed in claim 16, wherein:
the conductive layer is fired in a firing process with a maximum temperature of at least 900° C., preferably at least about 930° C. to 960° C. and especially preferably about 950° C.

23. The method as claimed in claim 16, wherein:
ceramic components of a pressure sensor with the prepared conductive layers are joined with active braze in a high vacuum brazing process with a pressure of not more than about 10^-6 mbar and temperatures of not less than about 900° C.

\* \* \* \* \*